United States Patent [19]

Lohse et al.

[11] 3,718,623
[45] Feb. 27, 1973

[54] HEAT-CURABLE POLYURETHANE FOAMS AND ELASTOMERS BASED ON AROMATIC POLYESTERS

[75] Inventors: Friedrich Lohse, Allschwil; Rolf Schmid, Reinach/Bl; Hans Batzer, Arlesheim, all of Switzerland

[73] Assignee: Ciba-Geigy AG, Basel, Switzerland

[22] Filed: March 1, 1971

[21] Appl. No.: 120,055

[30] Foreign Application Priority Data

March 5, 1970 Switzerland..........................3274/70

[52] U.S. Cl..........260/75 NP, 117/161 KP, 161/190, 260/2.5 AK, 260/2.5 AN, 260/2.5 AT, 260/22 TN, 260/37 N, 260/75 NT, 260/77.5 AN, 260/77.5 AT, 260/DIG. 34, 260/DIG. 35
[51] Int. Cl.....C08g 22/12, C08g 22/24, C08g 22/44
[58] Field of Search....260/77.5 AN, 2.5 AN, 75 NK, 260/75 NP, 77.5 AT, 75 NT

[56] References Cited

UNITED STATES PATENTS

| | | | |
|---|---|---|---|
| 3,186,971 | 6/1965 | Hostettler et al.....................260/77.5 |
| 3,352,830 | 11/1967 | Schmitt et al........................260/77.5 |
| 3,459,733 | 8/1969 | Byrd et al..............................26/210 |
| 3,502,601 | 3/1970 | Case et al..............................260/2.5 |

Primary Examiner—Donald E. Czaja
Assistant Examiner—H. S. Cockeram
Attorney—Harry Goldsmith, Joseph G. Kolodny and Mario A. Monaco

[57] ABSTRACT

Heat-curable plasticized mixtures for the manufacture of moulding materials based on polyurethanes, containing (a) a polyisocyanate, for example 3,5,5-trimethyl-3-(isocyanato-methyl)-cyclohexane-isocyanate-(1) ["isophoronediisocyanate"], (b) a long-chain polyester processing terminal hydroxyl groups (for example a polyester of 4 mols of sebacic acid and 4.5 mols of 1,6-hexanediol) and (c) a defined aromatic polycarboxylic acid hydroxyester containing at least one secondary hydroxyl group (for example a hydroxyester manufactured by reacting 1 mol of trimellitic anhydride and 1 mol of 1,2-propanediol in a first stage, and further reaction with 2 mols of a monoepoxide), with the mixture containing, per 1 equivalent of isocyanate group, 0.05 to 0.3 hydroxyl equivalents of the polyester (b) and 0.3 to 1.0 hydroxyl equivalents of the aromatic polycarboxylic acid hydroxyester (c). The mouldings obtained by hot curing of the moulding compositions are flexible, tough and impact-resistant, and these mechanical properties are largely independent of temperature; a transition to the soft rubbery-elastic state only occurs above 150° C.

15 Claims, No Drawings

HEAT-CURABLE POLYURETHANE FOAMS AND ELASTOMERS BASED ON AROMATIC POLYESTERS

It is known that it is possible, by reaction of polyisocyanates with aliphatic polyesters possessing OH end groups, to manufacture flexible mouldings which display a high degree of flexibility at room temperature. Such mouldings are, however, easily deformable and even at a slightly elevated temperature retain only little strength. It was further possible to achieve an improvement in the strength at elevated temperature by the synthesis of polymers which contain crystalline regions. These elastomeric polymers in part show a relatively high strength at higher temperatures, especially after prior stretching. The mouldings, however, have a low E-modulus and are easily deformable, especially in the unstretched state. As a rule they are heat-fusible and cannot be used by the casting process or impregnating process. Additionally, the permanent deformation (stretching) is disadvantageous for certain applications.

It has now been found that the reaction of polyisocyanates (1) with aliphatic polyesters possessing OH end groups (2) and with polyols of special structure (3) yields flexible, tough, impact-resistant mouldings, in which the mechanical properties are largely independent of the temperature. The mouldings in general show good elasticity and good dimensional stability to deformation, up to relatively high stresses. They are infusible and only change to the soft rubbery-elastic state at high temperatures, in most cases only above 150° C. The mouldings are amorphous, in general do not show any permanent deformation, and show no crystallization shrinkage, even on cooling. This opens up entirely new prospects for the industrial use of the new flexible polyurethane resin mixtures, especially in the field of casting, impregnating and laminating resins, foams, adhesives, tool resins and compression moulding compositions.

The present invention therefore provides heat-curable plasticized mixtures based on polyisocyanates and phenols which are suitable for use as casting, impregnating and laminating resins, and as adhesives and compression moulding compositions, characterized in that they contain (1) a polyisocyanate with an average of more than one isocyanate group in the molecule; e.g. diisocyanates and triisocyanates (2) a long-chain polyester, containing terminal hydroxyl groups, of the formula $$HO-X-OH \qquad (I)$$

wherein X denotes a polyester radical in which branched or unbranched alkylene and/or alkenylene chains alternate with carboxylic acid ester groups, and wherein the quotient Z/Q, wherein Z is the number of the carbon atoms present in hydrocarbon radicals in the recurring structural element of the radical X, and Q is the number of oxygen bridges present in the recurring structural element of the radical X, must be at least 4 and preferably at least 5, and wherein, further, the total number of the carbon atoms present in the radical X in alternating hydrocarbon radicals is at least 30, preferably at least 50, and (3) an aromatic polycarboxylic acid hydroxyester, containing at least one secondary hydroxyl group, of the formula

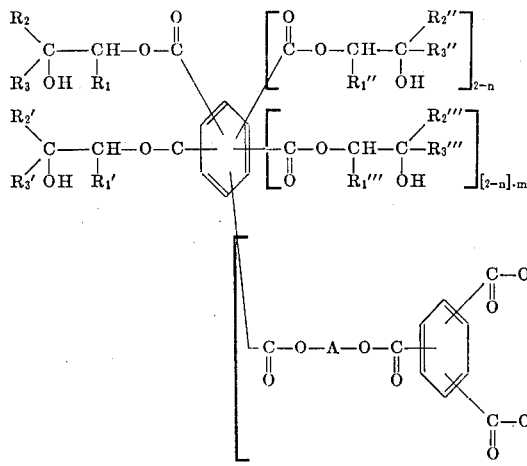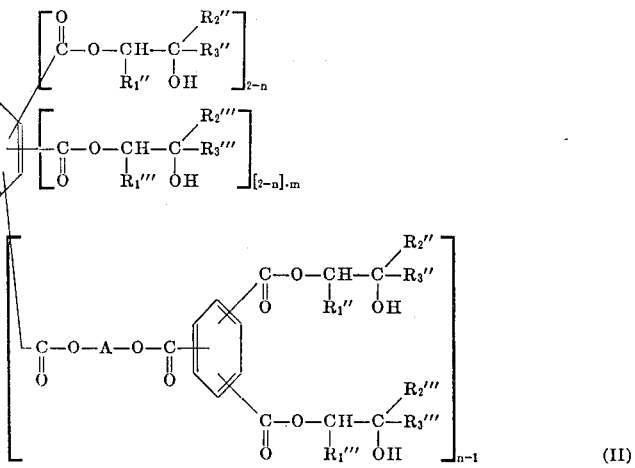

(II)

wherein $R_1$, $R_1'$, $R_1''$, $R_1'''$, $R_2$, $R_2'$, $R_2''$ratio and $R_2'''$ each denotes a hydrogen atom or a methyl group, or $R_1$ and $R_2$, or $R_1'$ and $R_2'$, or $R_1''$ and $R_2''$ or $R_1'''$ and $R_2'''$ together form a divalent aliphatic or cycloaliphatic radical required for completing a ring, $R_3$, $R_3'$, $R_3''$ and $R_3'''$ each denotes a hydrogen atom or an unsubstituted or substituted or oxygen atom-interrupted aliphatic, cycloaliphatic, araliphatic, aromatic or heterocyclic monovalent radical, with at least one of the radicals $R_3$, $R_3'$, $R_3''$ or $R_3'''$ representing such an aliphatic, cycloaliphatic, araliphatic, aromatic or heterocyclic radical, A denotes an alkylene radical with two to three carbon atoms, m denotes the number 0 or 1 and n denotes the number 1 or 2, and that the curable mixture contains, per 1 equivalent of isocyanate group of the polyisocyanate (1), 0.3 to 1.0 equivalent of hydroxyl groups of the aromatic polycarboxylic acid ester (3) which contains hydroxyl groups, and 0.02 to 0.5, preferably 0.05 to 0.3, equivalent of hydroxyl group of the polyester (2).

Instead of the individual components (1) and (2), the curable mixtures according to the invention can also contain a pre-reacted addition product of the polyisocyanate (1) and the polyester (2), in which case, as indicated above, 0.02 to 0.5 hydroxyl group equivalent of the polyester is in each case used per 1 equivalent of isocyanate group for the adduct formation.

As polyisocyanates (1) it is in principle possible to employ, in the curable mixtures according the invention, all known types which are compatible with the components (2) and (3). These can be polyisocyanates, above all diisocyanates, of the aliphatic, cycloaliphatic, araliphatic, aromatic and heterocyclic series. As examples there may be mentioned: ethylenediisocyanate, trimethylenediisocyanate, diisocyanates of the formula OCN-Y-NCO, wherein Y denotes the hydrocarbon radical of an optionally hydrogenated dimerized fatty alcohol; toluylene-2,4-diisocyanate, toluylene-2,6-diisocyanate or their technical mixtures; diphenylmethane-4,4'-diisocyanate, 3,3'-dimethyl-diphenyl-4,4'-diisocyanate, 3,3'-dimethoxy-4,4'-biphenyl-diisocyanate, 3,3'-dichloro-diphenyl-4,4'-diisocyanate, 4,4'-diphenyldiisocyanate, diphenyldimethyl-methane-4,4'-diisocyanate, p,p'-dibenzyl-diisocyanate, phenylene-1,4-diisocyanate; phenylene-1,3-diisocyanate, 2,3,5,6-tetra-methyl-p-phenylenediisocyanate; the addition products of 2 mols of toluylene-2,4-diisocyanate to one mol of a glycol, of 3 mols of toluylene-2,4-diisocyanate to 1 mol of a triol, such as 1,1,1-trimethylolpropane, whereby an aromatic isocyanate, containing urethane groups, which in the ideal case is trifunctional, is produced, and also the corresponding addition products of 2 mols of "isophoronediisocyanate" to 1 mol of a glycol.

Preferably, diisocyanates of the cycloaliphatic, cycloaliphatic-aliphatic or araliphatic series are used, such as cyclopentylene-1,3-diisocyanate, cyclohexylene-1,4-, -1,3-or -1,2-diisocyanate, hexahydrotoluylene-2,4- or -2,6-diisocyanate, 3,5,5-trimethyl-3-isocyanatomethyl-cyclohexane-1-isocyanate (="isophorone-diisocyanate"); dicyclohexylmethane-4,4'-diisocyanate; and o-, m- and p-xylylene-$\alpha,\alpha'$-diisocyanate.

Preferentially used diisocyanates are further those of the heterocyclic-aliphatic series; examples which may be mentioned are: 1,3-di-($\gamma$-isocyanatopropyl-hydantoin, 1,3-di-($\gamma$-isocyanatopropyl)-5-methyl-hydantoin, 1,3-di-($\gamma$-isocyanatopropyl)- 5,5-dimethyl-hydantoin, 1,3-di-($\gamma$-isocyanatopropyl)-5-methyl-5-ethyl-hydantoin, 1,3-di-($\gamma$-isocyanatopropyl)-5-ethyl-hydantoin, 1,3-di-($\gamma$-isocyanatopropyl)-5-propyl-hydantoin, 1,3-di-($\gamma$-isocyanatopropyl)-5-isopropyl-hydantoin, 1,3-di-($\gamma$-isocyanatopropyl)-1,3-diazaspiro-(4,4)-nonane-2,4-dione and 1,3-di-($\gamma$-isocyanatopropyl)-1,3-diazaspiro-(4,5-decane-2,4-dione, 1,3-di-($\gamma$-isocyanatopropyl)-5,5-dimethyl-5,6-dihydro-uracil and 1,3-di-($\gamma$-isocyanatopropyl)-6-methyl-5,6-dihydro-uracil; 1,1'-methylene-bis-(3-$\gamma$-isocyanatopropylhydantoin); 1,1'-methylene-bis-(3-$\gamma$-isocyanatopropyl-5,5-dimethylhydantoin; 1,1'-methylene-bis-(3-$\gamma$-isocyanatopropyl-5-methyl-5-ethyl-hydantoin); bis-(1'-$\gamma$-isocyanatopropylhydantoinyl-3')-methane; 1,2-bis-(1'-$\gamma$-isocyanatopropyl-5',5'-dimethylhydantoinyl-3')-ethane; 1,4-bis-(1'-$\gamma$-isocyanatopropyl-5'-methyl-5'-ethyl-hydantoinyl-3')-butane; 1,6-bis-(1'-$\gamma$-isocyanatopropyl-5'-isopropylhydantoinyl-3')-hexane; 1,12-bis-(1'-$\gamma$-isocyanato-propyl-5',5'-pentamethylenehydantoinyl-3')-dodecane and $\beta,\beta'$-bis-(1'-$\gamma$-isocyanatopropyl-5',5'-dimethylhydantoinyl-3')-diethylether.

The long-chain polyesters of the formula (I) used for the manufacture of the curable mixtures according to the invention represent polyesters with two terminal hydroxyl groups. Such polyesters are obtained according to known methods by polycondensation of aliphatic dicarboxylic acids with aliphatic diols in a suitable molar ratio. The chain of such polyesters is built up of the alternating structural unit of the dicarboxylic acid and of the alternating structural unit of the diol. The recurring structural element, that is to say the smallest recurring chemical grouping in the chain, is represented by the two structural units of the dicarboxylic acid and of the dialcohol, linked to one another by an ester bond, and has the formula

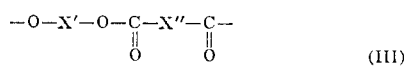

wherein X' the hydrocarbon radical of the diol and X'' the hydrocarbon radical of the dicarboxylic acid. The dicarboxylic acid and the diol for the synthesis of the acid polyester must at the same time be so chosen that the sum of the number of carbon atoms of the dicarboxylic acid minus 2 and of the number of the carbon atoms of the diol, divided by the two oxygen bridge atoms of the structural element, is at least 4 and preferably at least 5. As a rule, at least one of the two structural units should contain at least four carbon atoms in the hydrocarbon radical.

Further, the molar ratio of the aliphatic dicarboxylic acid and the aliphatic dialcohol must be so chosen for the polycondensation that the sum of the carbon atoms present in total in hydrocarbon radicals in the alternating structural elements of the polyester chain produced is at least 50. As aliphatic dicarboxylic acids with at least four C atoms in the hydrocarbon radical, which can preferentially serve for the synthesis of such acid polyesters, there may be mentioned: adipic acid, pimelic acid, suberic acid, azelaic acid, sebacic acid, nonanedicarboxylic acid, decanedicarboxylic acid, undecanedicarboxylic acid, dodecanedicarboxylic acid, allyl-succinic acid, dodecyl-succinic acid and dodecenyl-succinic acid.

As aliphatic diols with at least four C atoms which can preferentially serve for the synthesis of the acid polyesters in question, there may be mentioned: 1,4-butanediol, 1,5-pentanediol, neopentylglycol, 1,6-hexanediol, 1,7-heptanediol, 1,8-octanediol, 1,9-nonanediol, 1,10-decanediol, 1,11-undecane-diol, 1,12-dodecanediol, 1,6-dihydroxy-2,2,4-trimethylhexane and 1,6-dihydroxy-2,4,4-trimethyl-hexane.

When using a higher dicarboxylic acid, such as adipic acid or sebacic acid, for the synthesis of the acid polyester, it is also possible to use a lower aliphatic diol, such as, for example, ethylene glycol or 1,3-propanediol. Conversely, when using a higher diol, such as 1,6-hexanediol or 1,10-decane-diol, for the synthesis of the acid polyester, a lower aliphatic dicarboxylic acid, such as, for example, succinic acid or glutaric acid, can also be used. However, in the combination of dicarboxylic acid and diol it is always necessary to ensure strictly that the condition, according to which the quotient Z/Q must always be at least 4, is observed.

To manufacture polyesters with predominantly terminal hydroxyl groups, a molar ratio of dicarboxylic acid to diol of less than 1 must furthermore be chosen.

The acid polyesters used according to the invention preferentially correspond, as a rule, to the formula

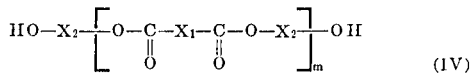

wherein $X_1$ and $X_2$ denote branched or unbranched alkylene or alkenylene chains, with each of the two radicals $X_1$ and $X_2$ having to contain at least such a number of carbon atoms that the sum of the carbon atoms in $X_1$ and $X_2$ together is at least eight, and wherein the number m is so chosen that the product of m and of the sum (C atoms in $X_1$ + C atoms in $X_2$) is at least 50.

It is however also possible to use polyesters with terminal hydroxyl groups which are manufactured by condensation of a suitable dicarboxylic acid with a mixture of two or more suitable diols, or conversely by condensation of a suitable diol with a mixture of two or more suitable dicarboxylic acids, in the correct mutual stoichiometric ratio. It is of course also possible to manufacture polyesters by condensation of mixtures of different dicarboxylic acids with mixtures of different diols, always provided that the conditions postulated above for the quotient Z/Q and the total number of carbon atoms in the polyester chain remain observed.

Further polyesters suitable for the purposes of the invention are those obtainable by addition of $(a+b)$ mols of a lactone to 1 mol of a diol according to the reaction equation

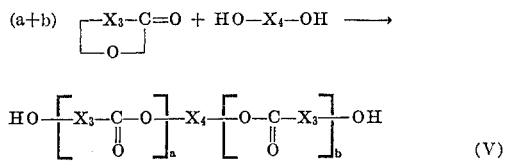

(V)

wherein $X_3$ denotes an alkylene chain with at least four, and preferably at least five, carbon atoms, $X_4$ represents an aliphatic hydrocarbon radical, and the numbers $a$ and $b$ are so chosen that the product of $(a+b)$ and of the sum (C atoms in $X_3$) is at least 50.

In this class of compound, the alternating structural unit is identical with the recurring structural element in the chain, and hence the structural element contains a single oxygen bridge. Hence in this case the quotient Z/Q becomes identical to the number of C atoms in the hydrocarbon radical of the lactone from which the polyester is synthetized.

The addition products of $(a+b)$ mols of ε-caprolactone to 1 mol of 1,4-butanediol or 1,6-hexanediol may be mentioned as examples.

The aromatic polycarboxylic acid esters (3) of the formula (II), wherein $n = 1$, which are employed in the curable mixtures according to the invention, can be manufactured by esterification of a benzene tricarboxylic acid or benzene tetracarboxylic acid, such as trimesic acid, hemimellitic acid and especially trimellitic acid or pyromellitic acid, or of the functional derivatives of these polycarboxylic acids, such as especially the anhydrides, with a monoepoxide of the formula

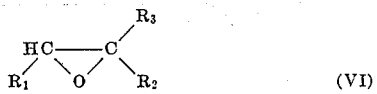

(VI)

or with a glycol of the formula

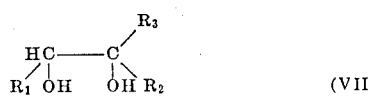

(VII)

wherein the esterification is carried out in a single stage or several stages, and $R_1$, $R_2$ and $R_3$ have the same meaning as in the formula (II), but with the proviso that $R_3$ must not be hydrogen if the esterification is carried out in a single stage with a single compound of the formula (VI) or (VII). Against this, a compound wherein $R_3$ represents a hydrogen atom can be employed in a two-stage process, wherein, in one stage, at least one carboxyl group of the benzenepolycarboxylic acid is esterified with a monoepoxide (VI) or a glycol (VII), wherein $R_3$ is other than hydrogen.

The synthesis of the polycarboxylic acid ester (3), starting from benzenepolycarboxylic acid and monoepoxide (VI), takes place according to the following equation:

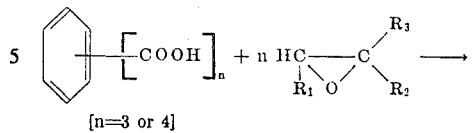

[n=3 or 4]

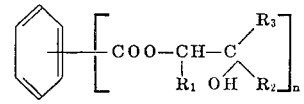

Suitable monoepoxides (VI) for the manufacture of the esters containing hydroxyl groups are especially: propene oxide, 1,2-epoxy-butane, butane-2,3-epoxide, pentane-2,3-epoxide, cyclohexene-oxide, styrene-oxide, phenyl-glycidyl-ether, cresyl-glycidyl-ether, N-glycidyl-oxazolidin-2-one and 3(N)-glycidyl-5,5-dimethyl-hydantoin.

In a multi-stage esterification of the carboxyl groups, ethylene oxide can also be employed, but in this case at least one of the carboxyl groups present must be esterified with a monoepoxide other than ethylene oxide.

If a start is made from an anhydride of the benzenepoly-carboxylic acid, it can be of advantage to carry out the esterification, in a first stage, with 1 mol of a glycol of the formula (VII) per 1 anhydride group, whereby the anhydride groups are split and half-esters with free carboxyl groups are produced. In the case of trimellitic anhydride, the equation applying to this first stage is, for example:

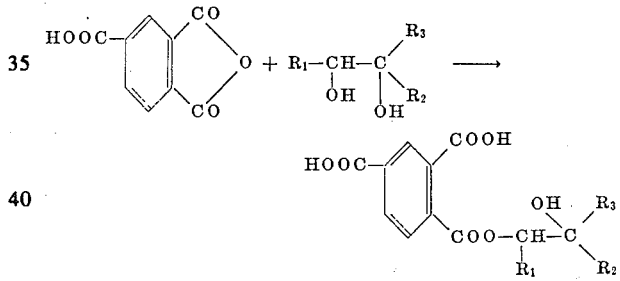

The esterification of the remaining free carboxyl groups of the half-ester thus produced is then advantageously carried out by reaction with the requisite equivalent quantity of a monoepoxide of the formula (VI), and the monoepoxide chosen for the second stage esterification can be derived from a glycol which is identical or different from the glycol used in the first esterification stage.

As glycols (VII) there may for example be mentioned: 1,2-propanediol and 1,2-butanediol; ethylene glycol can also be used for a partial esterification provided that a different glycol, or a monoepoxide other than ethylene oxide, is used for the esterification in a further stage.

Preferably, the benzenetricarboxylic or benzenetetra-carboxylic acid hydroxyesters of the formula (II) contain at least two secondary hydroxyl groups. The aromatic polycarboxylic acid esters (3) of the formula (II), wherein $n = 2$, can be manufactured by reacting 2 mols of the monoanhydride of a benzenetricarboxylic acid, such as especially trimellitic anhydride, with 1 mol of a glycol with two or three carbon atoms, such as ethylene glycol, 1,2-propanediol or 1,3-propanediol, in a first stage, for example in accordance with the reaction equation

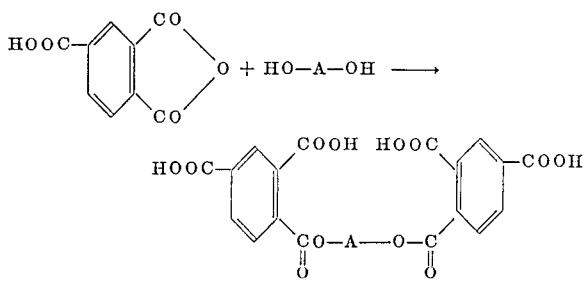

and subsequently esterifying the tetracarboxylic acid thus obtained with 4 mols of an epoxide of the formula (VI).

The curable mixtures according to the invention are above all suitable for use as casting resins, impregnating resins and adhesives. A further industrially interesting field of use consists of the manufacture of flexible foams which are intended to have good elastic recovery and high dimensional stability over as wide a temperature range as possible. It is furthermore possible to achieve certain additionally desired effects, such as, for example, increasing the modulus or the dimensional stability, or reducing the combustibility, by adding suitable organic or inorganic modifiers.

As mentioned initially, it is also possible to anticipate the reaction between the polyisocyanate (1) and the polyester (2), using a major excess of isocyanate for this pre-reaction; such an adduct, which still contains free isocyanate groups or a proportion of unreacted polyisocyanate, can be used in the curable mixture in place of the individual components (1) and (2) which have not been pre-reacted. In general, mouldings with similar properties are obtained with such adducts. Curable mixtures based on such adducts however display a high viscosity and are therefore less suitable for use as a casting or impregnating resin. They can, however, advantageously be used as compression moulding compositions, laminating resins or adhesives, or in the field of surface protection, for example as fluidized bed sintering powders or lacquer resins, since their sensitivity to moisture is low.

The curing of the curable mixtures according to the invention to give moulded materials is carried out in a known manner with warming, as a rule in the temperature range of 100°–200° C.

The term "curing" as used here denotes the conversion of the abovementioned polyisocyanates into insoluble and infusible, crosslinked products, and in particular, as a rule, with simultaneous shaping to give mouldings, such as castings, foams, tool resins, pressings or laminates, or to give sheetlike structures, such as lacquer films or adhesive bonds.

The curable mixtures according to the invention can be mixed, in any stage before cure, with other customary additives or modifiers, such as fillers, dyestuffs, pigments, flame-proofing substances, mould release agents and the like. As extenders and fillers it is, for example, possible to use glass fibers, carbon fibers, boron fibers, mica, quartz powder, cellulose, burnt kaolin, ground dolomite, colloidal silicon dioxide of high specific surface area (= silica aerogel, registered trade name AEROSIL) or metal powders, such as aluminum powder.

The cured mouldings are distinguished by high flexibility (high deflection in the bending test) and impact strength. The modulus of shear at room temperature has been markedly lowered by the plasticization. The moulded materials however have a surprisingly high tensile strength; their electrical, and especially mechanical, properties only change very slightly with temperature, so that the mouldings are still distinctly flexible at temperatures below 20° C., but on the other hand still show good strengths at temperatures of up to 100° C., and in part up to above 160° C. A valuable point of reference regarding the change in the physical properties as a function of the temperature is provided by the values of the modulus of shear, measured at various temperatures, for example according to DIN 53,445.

In the examples which follow, percentages denote percentages by weight.

The following long-chain polyesters containing hydroxyl groups and benzenepolycarboxylic acid esters containing hydroxyl groups were used for the manufacture of plasticized curable mixtures, described in the examples:

Manufacture of the long-chain polyesters.

Polyester A 808.0 g (4.0 mols) of sebacic acid and 519.2 g (4.40 mols) of hexane-1,6-diol (corresponding to a patio of di-carboxylic acid to glycol of 10:11), were mixed, 1.0 g of p-toluenesulphonic acid was added and the mixture was heated to 150° C. under a nitrogen atmosphere. Thereafter it was heated for 1 hour at each of 150° C., 160° C. and 170° C., and the reaction was completed over the course of a further 20 hours at 180° C. For the last 4 hours of this reaction time, the reaction was allowed to take place under 60 mm Hg. The amount of water split off was then 135 g (theory 144 g). The light brown-colored, crystalline polyester had an acid equivalent weight of 10,980 and a hydroxy equivalent weight of 1142 (theory 1479).

Polyester B 808.0 g (4.0 mols) of sebacic acid and 531.0 g (4.5 mols) of hexane-1,6-diol (corresponding to a ratio of di-carboxylic acid to glycol of 8:9) were mixed with 1 g of p-toluenesulphonic acid and 600 ml of toluene and heated under a nitrogen atmosphere, in the course of which the water formed was distilled off azeotropically by the circulatory process and was separated off in a water separator. After 20 hours, the separation of water was complete and the reaction mixture was finally concentrated to constant weight under a high vacuum (0.61 mm Hg). The product had a hydroxyl equivalent weight of 1,193 (theory 1195), and the acid number was 0.

Polyester C 438.4 g (3.0 mols) of adipic acid and 297.4 g (3.3 mols) of butane-1,4-diol (corresponding to a ratio of di-carboxylic acid to glycol of 10:11) were mixed and heated to 165° C. for 1 hour under a nitrogen atmosphere. The temperature was then raised to 180°–185° C. and the mixture was allowed to continue reacting for 24 hours without vacuum and subsequently for 32 hours under a waterpump vacuum (12 mm Hg). The amount of water split off was then 105 g (theory: 108), the acid equivalent weight was 21,900 and the hydroxyl equivalent weight was 1,275 (theory 1135). The product was a glassy mass which softened at 30°–40° C.

Polyester D 764.0 g (3.78 mols) of sebacic acid and 445.0 g (4.15 mols + 3 percent excess) of neopentylglycol (corresponding to a ratio of dicarboxylic acid to glycol of 10:11) were mixed in a sulphonation flask with a descending condenser and heated to 155°–160° C.

under a nitrogen atmosphere. After 16 hours 133 g (theory 136 g) of water had been split off. Thereafter the mixture was allowed to continue reacting at the same temperature, under 60–80 mm Hg, until, after 42 hours, the hydroxyl equivalent weight only showed a slight rise and reached a value of 1,270 (theory 1403). The acid equivalent weight was here 9,350. The product was highly viscous and light yellow in color.

Polyester E 9.0 g (0.1 mol) of butane-1,4-diol were mixed with 136.8 g (1.2 mols) of ε-caprolactone, corresponding to a molar ratio of 1:12, 700 mg of lead acetate were added thereto, and the mixture was warmed to 170° C. under a nitrogen atmosphere. The reaction mixture was then allowed to react for 15 hours at the same temperature. The reaction product was a light brown, wax-like mass having an acid equivalent weight of 35,400, a hydroxyl equivalent weight of 708 (theory: 279) and a melting point of 54° C. (measured in the "differential scanning calorimeter").

Polyester F 11.8 g (0.1 mol) of hexane-1,6-diol were mixed with 205.2 g (1.8 mols) of ε-caprolactone, corresponding to a molar ratio of 1:18, 800 mg of lead acetate were added thereto, and the mixture was warmed to 170° C. under a nitrogen atmosphere. The reaction mixture was then allowed to react for 1½ hours at the same temperature. The reaction product was a brown, wax-like mass having an acid equivalent weight of 31,500, a hydroxyl equivalent weight of 1,075 (theory: 1310) and a melting point of 58° C. (measured in the "differential scanning calorimeter").

Polyester G 376.0 g (2.0 mols) of azelaic acid were mixed with 361.0 g (3.0 mols + 2 percent excess) of hexane-1,6-diol and the mixture was warmed to 180° C. under a nitrogen atmosphere. The reaction mixture was then left to react for 15 hours at 180° C. 80 ml of distillate were obtained during the course thereof. The reaction product was a light brown, wax-like mass having an acid equivalent weight of 56,450 and a hydroxyl equivalent weight of 362 (theory: 329).

Polyester H 1023.0 g (7.0 mols) of adipic acid were mixed with 425.0 g (4.0 mols + 2 percent excess) of neopentylglycol and 367.7 g (4.0 mols + 2 percent excess) of butane-1,4-diol, and warmed to 165°– 170° C. under a nitrogen atmosphere. The reaction mixture was then allowed to react for 7 hours at 165°–170°C. and 20 hours at the same temperature under 50 mm Hg. In the course thereof, 256.0 g of distillate were obtained, still containing small proportions of tetrahydrofurane formed from the butane-1,4-diol employed (theoretical amount of water: 252 g). The reaction product was a light yellow mass of relatively low viscosity, having an acid equivalent weight of 3,775 and a hydroxyl equivalent weight of 778 (theory: 774).

Manufacture of the benzenepolycarboxylic acid hydroxyesters:

Trihydroxyester I from trimellitic anhydride, propanediol and cyclohexene oxide.

384 g (2 mols) of trimellitic anhydride were dissolved in 1,200 ml of pure dioxane, 0.5 ml of pyridine was added and the mixture was warmed to 40° C. 152 g (2 mols) of propane-1,2-diol were added dropwise thereto over the course of 10 minutes. A very slight exothermic reaction occurred, which raised the temperature in the reaction mixture to 42° C. The reaction was allowed to continue for 3 hours at 40° C. and thereafter the reaction mixture was cooled, filtered, and finally concentrated to constant weight under a high vacuum, at 150° C. bath temperature. The product is then a slightly cloudy viscous melt. It solidifies at room temperature to give a glassy mass which starts to soften at 85°C. The acid equivalent weight was 148.

148 g (1.0 acid equivalent weight) of the product of trimellitic anhydride and propanediol, described above, were heated to 130° C. and 117.6 g (1 mol + 20 percent excess) of cyclohexene oxide were added dropwise over the course of 40 minutes. After completion of the addition, the reaction was allowed to continue for 7 hours at the same temperature, in the course of which the acid equivalent weight rose to above 7,000. Thereafter, excess cyclohexene oxide was removed under a waterpump vacuum. The crude product had an acid equivalent weight of 7,270 and a hydroxyl equivalent weight of 171 and was a brown-colored substance.

The reaction takes place in two stages according to the following set of equations:

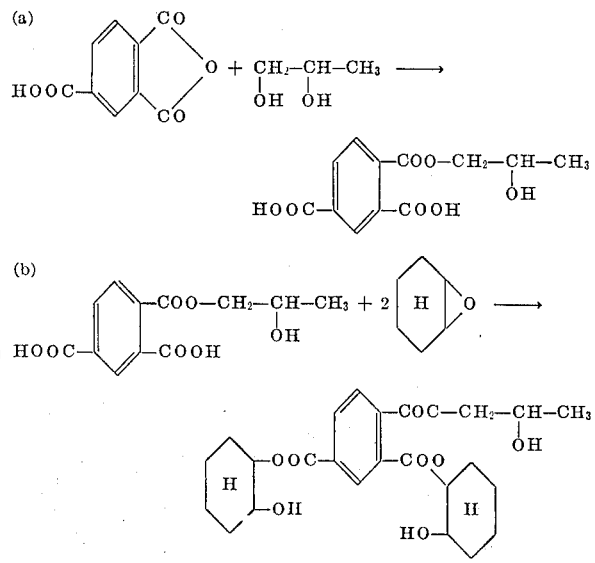

Trihydroxyester II from trimellitic anhydride, propane-1,2-diol and cresyl-glycidyl-ether.

768 g (4 mols) of trimellitic anhydride were dissolved in 2,000 ml of pure dioxane, 1 ml of pyridine was added as the catalyst, and the mixture was warmed to 45°–50° C. 304 g (4 mols) of propane-1,2-diol were added dropwise thereto over the course of 10 minutes, whereupon a slightly exothermic reaction occurred, which was however barely able to raise the temperature in the reaction mixture to above 52° C. The reaction was allowed to continue for a further 2 hours at 50° C. and the reaction mixture was then freed of insoluble constituents by filtration. The filtrate was gently concentrated under a waterpump vacuum and subsequently to constant weight at 160° C. bath temperature under a high vacuum. The product is then a slightly cloudy viscous melt which solidifies to a glass at room temperature. This crude trimellitic acid mono-β-hydroxy-propyl ester softens at approx. 85° C., is a homogeneous melt at approx. 160° C., and has an acid equivalent weight of 153 (theory 134). 0.4 g of benzyl-trimethylammonium chloride were added to 210 g (1.28 mols) of freshly distilled cresyl-glycidyl-ether (technical isomer mixture, epoxide equivalent weight 163.5), and 210 g (0.62 equivalent of the measured acid equivalent weight) of the product of trimellitic anhydride and propane-1,2-diol, as described above, were added over the course of 30 minutes at 130°-135° C., and dissolved rapidly. The mixture was then allowed to continue to react for 1 hour at 134°-135° C., in the course of which small amounts of water were split off and no further epoxide content was detectable. Finally, the mixture was allowed to continue to react for approx. 1 hour under a waterpump vacuum of 15 mm Hg, in order to remove the water formed.

The product was glassy and brown-colored at room temperature, softens at approx. 50° C. and had an acid equivalent weight of 10,920 and a hydroxyl equivalent weight of 256 (theory 212).

The reaction takes place in accordance with the following set of equations:

Trihydroxyester IV from trimellitic acid and cresyl-glycidyl-ether.

63.0 g (0.3 mol) of trimellitic acid were suspended in 306.3 g (1.86 mol) of freshly distilled cresyl-glycidyl-ether (technical isomer mixture, epoxide equivalent weight 163.5, boiling point 82° C./0.01 mm Hg), and 0.5 g of benzyl-trimethylammonium chloride was added. This reaction mixture is then heated to 140°-150° C., whereupon a moderately exothermic reaction occurred, so that the temperature could be kept at 150° C. by cooling by means of an ice bath. Thereafter, a further 63 g (0.3 mol) of trimellitic acid were added over the course of 3 minutes, during which the exothermic reaction continued, and 10 minutes later only small amounts of undissolved constituents were present in the yellow-colored reaction mixture. After the exothermic reaction had subsided, the material proved to be completely dissolved and the reaction was allowed to continue for 7 hours at 140°-145° C. A light brown-colored product solidifying to a glass at room temperature was obtained, having a acid equivalent weight of 5,690 and a hydroxyl equivalent weight of 275 (theory 234).

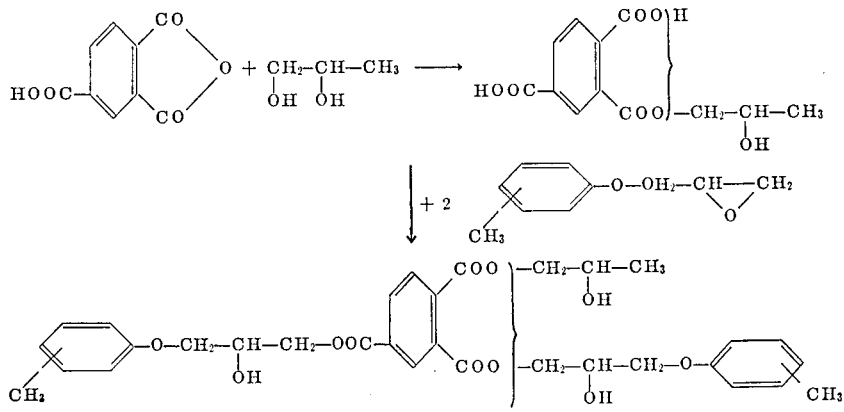

Trihydroxyester III from trimellitic acid and cyclohexene oxide.

52.5 g (0.25 mol) of trimellitic acid were dissolved in 100 ml of pure dimethylformamide whilst stirring, and 0.2 ml of N,N-dimethylbenzylamine was added. The mixture was now heated to 130° C and 73.5 g (0.75 mol) of cyclohexene oxide were added dropwise over the course of 1 hour. After completion of the addition, the mixture was allowed to react at 128°-130° C. until the acid equivalent weight of a concentrated sample had risen to above 10,000. This was reached after 11 hours, after which the reaction mixture was finally concentrated to constant weight under a high vacuum (0,01 mm Hg). The product is red-brown in color and highly viscous, and now has an acid equivalent weight of 11,000 and a hydroxyl equivalent weight of 175 (theory 168).

The reaction takes place in a single stage according to the following equation:

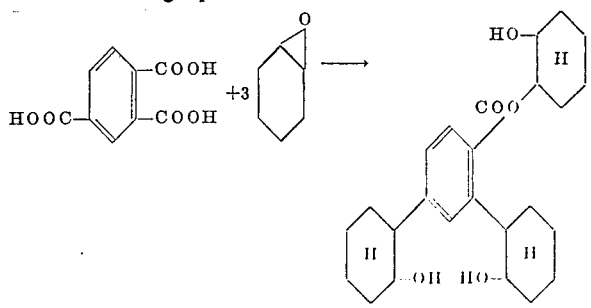

The reaction takes place in one stage according to the following equation:

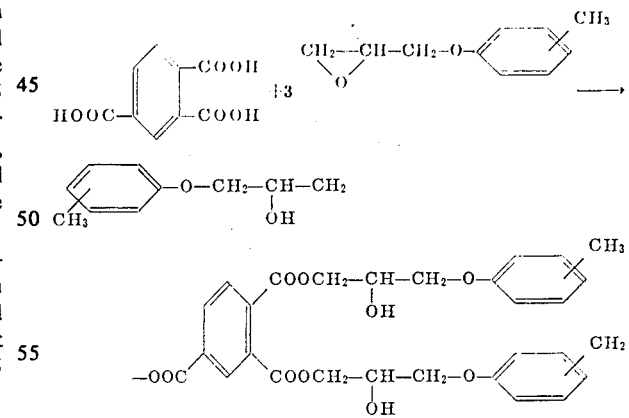

Tetrahydroxyester V from pyromellitic anhydride, propane-1,2-diol and cyclohexene oxide.

76.0 g (1.0 mol) of propane-1,2-diol were mixed with 109.0 g (0.5 mol) of pyromellitic anhydride and 0.7 ml of N-benzyl-dimethylamine and dissolved at 130° C., requiring approx. 15 minutes. Thereafter, 138.0 g (1.0 mol + 41 percent excess) of cyclohexene oxide were added dropwise at the same temperature over the course of 30 minutes. The reaction mixture was then allowed to react for 12 hours at 130° C. The reaction product was a brown, glassy mass at room temperature and had an acid equivalent weight of 1713 and a hydroxyl equivalent weight of 215 (theory: 188).

The reaction takes place according to the following set of equations:

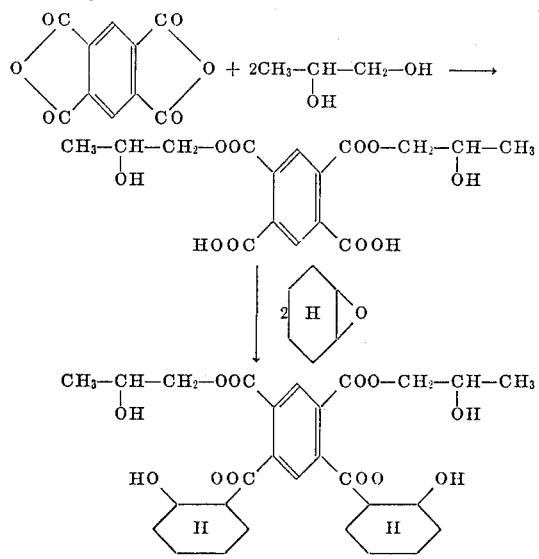

Processing examples.

Sheets of size 135 × 100 × 4 mm were manufactured for determining the flexural strength, deflection, impact strength and water absorption, and identical sheets, but of 1 mm thickness, were manufactured for the tensile test and the modulus of shear. The appropriate test specimens were machined from the sheets; for the tensile test, the test specimens No. 2 according to ISO R 527 were punched out at about 150° C., using a well-sharpened tool.

Example 1

145.5 g of trihydroxyester I (= 0.85 OH equivalent) were warmed to 180° C. and stirred for 2 hours under a vacuum of 12 mm Hg. Thereafter, 172 g of polyester A (= 0.15 equivalent) were added, and the mixture was cooled to 130° C. and stirred at this temperature. Finally, 112 g of 3,5,5-trimethyl-3-isocyanato-methyl-cyclohexane-1-isocyanate (="isophorone-diisocyanate") (= 1.0 equivalent) were added, in vacuo. The mixture was now stirred for a further 5 minutes, the vacuum was released by means of dry nitrogen, and the mixture was poured into the moulds of aluminum alloy (registered trade name "Anticorodal") which had been pre-warmed to 100° C. and treated with a silicone lacquer. After a heat treatment of 16 hours at 100° C., bubble-free mouldings were obtained, showing a stiff-elastic behavior up to relatively high stresses and elongations. The following properties were measured on the mouldings:

| | |
|---|---|
| flexural strength according to VSM 77,103 | =2.4 kg/mm$^2$ sample does not break |
| deflection according to VSM 77,103 | =>20 mm |
| impact strength according to VSM 77,105 | = sample does not break |
| tensile strength according to ISO R 527 | =340 kg/cm$^2$ |
| elongation at break according to ISO R 527 | =240 % |
| modulus of shear G according to DIN 53,445 | at −40°C=7.9×10$^9$ dyn/cm$^2$ −20°C=6.3×10$^9$ dyn/cm$^2$ 0°C=4.7×10$^9$ dyn/cm$^2$ +20°C=3.5×10$^9$ dyn/cm$^2$ 100°C=2.7×10$^9$ dyn/cm$^2$ 120°C=2.2×10$^9$ dyn/cm$^2$ 140°C=0.9×10$^9$ dyn/cm$^2$ |

The variation of the modulus of shear with temperature shows that the moulding still displays a high flexibility even at temperatures below 0° C., but also still displays a surprisingly high stiffness at temperatures above 100° C. The high toughness and the dimensional stability remain preserved over a wide temperature range.

Example 2

150.5 g of trihydroxyester I (= 0.88 equivalent) were warmed to 180° C. and stirred for 2 hours under a vacuum of 12 mm Hg. Thereafter, 137 g of polyester A (= 0.12 equivalent) and 20 g of anhydrous calcined sodium sulphate were added and the mixture was further stirred under normal pressure for 1 hour at 180° C. The mixture was cooled to 100° C., mixed for a short time with 112 g (= 1.0 equivalent) of "isophoronediisocyanate," subjected to a vacuum to remove the air bubbles, and poured into the pre-warmed moulds according to Example 1. After a heat treatment of 16 hours at 140° C., tough, almost bubble-free mouldings were obtained, which had the following properties:

tensile strength according to ISO R 527 = 390 kg/cm$^2$
elongation at break according to ISO R 527 = 25 percent

Example 3

151 g (= 0.88 equivalent) of trihydroxyester I, 143 g (= 0.12 equivalent) of polyester B and 10 g of Δ$^4$-tetrahydrophthalic acid diglycidyl ester were warmed to 130° C. and stirred for 15 minutes under a vacuum of 12 mm Hg. Thereafter the mixture was cooled to 110° C. and 112 g (= 1.0 equivalent) of "isophoronediisocyanate" were added at normal pressure. After briefly applying a vacuum to remove the air bubbles, the mixture was poured into the pre-warmed moulds according to Example 1 and subjected to a heat treatment of 16 hours at 105° C. The following properties were measured on the mouldings thus obtained:

| | |
|---|---|
| modulus of shear G according to DIN 53,445 at | 20°C=7.3×10$^9$ dyn/cm$^2$ 0°C=6.2×10$^9$ dyn/cm$^2$ 22°C=4.4×10$^9$ dyn/cm$^2$ 75°C=1.3×10$^9$ dyn/cm$^2$ |

Example 4

139 g (= 0.80 equivalent) of trihydroxyester III and 228 g (= 0.3 equivalent) of polyester A were warmed to 110° C. and mixed with 112 g of "isophoronediisocyanate." After briefly applying a vacuum, the mixture was poured into the moulds according to Example 1 and subjected to a heat treatment of 16 hours at 110° C. Very tough mouldings having the following properties were obtained:

tensile strength according to ISO R 527 = 154 kg/cm$^2$
elongation at break according to ISO R 527 = 400 percent

Example 5

191.2 g (= 0.15 equivalent) of polyester C and 233.8 g (= 0.85 equivalent) of trihydroxy compound IV were stirred for 1 hour at 130° C. under 13 mm Hg. 112 g (= 1.0 equivalent) of "isophoronediisocyanate" were added dropwise under the same vacuum, and the mixture was poured into the moulds according to Example 1, pre-warmed to 80° C. After a heat treatment of 16 hours at 100° C., mouldings having the following properties were obtained:

tensile strength according
to ISO R 527 = 200 kg/cm²
elongation at break
according to ISO R 527 = 220 %
E-modulus at 20°C = 1.9 × 10⁹ dyn/cm²

Example 6

176 g (= 0.12 equivalent) of polyester D and 225 g (= 0.88 equivalent) of trihydroxy compound II were stirred for 1 hour at 130° C. and 12 mm Hg. 112 g (= 1.0 equivalent) of "isophoronediisocyanate" were now added dropwise under the same vacuum, and the mixture was poured into the moulds according to Example 1, pre-warmed to 80° C. After a heat treatment of 10 hours at 100° C., mouldings having the following properties were obtained:

tensile strength according
to ISO R 527 = 200 kg/cm²
elongation at break
according to ISO R 527 = 330 %
E-modulus at 20° C = 1.6 × 10⁹ dyn/cm²
E-modulus at 50°C = 1.3 × 10⁹ dyn/cm²
E-modulus at 70°C = 0.3 × 10⁹ dyn/cm²

Example 7

161 g of tetrahydroxyester V (= 0.75 OH equivalent) and 177 g (= 0.25 equivalent) of polyester E were stirred for 1 hour at 130° C. and 12 mm Hg. 112 g (= 1.0 equivalent) of "isophoronediisocyanate" were now added dropwise under the same vacuum, and the mixture was poured into the moulds according to Example 1, pre-warmed to 100° C. After a heat treatment of 2 hours at 100° C., mouldings having the following properties were obtained:
tensile strength according to ISO R 527 = 100 kg/cm²
elongation at break according to ISO R 527 = 350 percent Example 8

161 g of tetrahydroxyester V (= 0.75 OH equivalent) and 269 g (= 0.25 equivalent) of polyester F were stirred for 1 hour at 130° C. and 12 mm Hg. 112 g (= 1.0 equivalent) of "isophoronediisocyanate" were now added dropwise under the same vacuum, and the mixture was poured into the moulds according to Example 1, pre-warmed to 100° C. After a heat treatment of 2 hours at 100° C., mouldings having the following properties were obtained:
tensile strength according to ISO R 527 = 41 kg/cm²
elongation at break according to ISO R 527 = 550 percent Example 9

96.2 g (= 0.35 OH equivalent) of the tetrahydroxyester V and 163 g (= 0.45 equivalent) of the polyester G were stirred for 1 hour at 130° C. and 12 mm Hg. 112 g (= 1.0 equivalent) of "isophoronediisocyanate" were now added dropwise under the same vacuum, and the mixture was poured into the mould according to Example 1, pre-warmed to 100° C. After a heat treatment of 2 hours at 100° C., mouldings having the following properties were obtained:
tensile strength according to ISO R 527 = 146 kg/cm²
elongation at break according to ISO R 527 = 310 percent Example 10

262 g (= 0.95 OH equivalent) of the trihydroxyester IV and 38.9 g (= 0.05 equivalent) of the polyester H were stirred for 1 hour at 130° C. and 12 mm Hg. 84 g (= 1.0 equivalent) of hexamethylenediisocyanate, having an isocyanate content of 11.9 equivalents/kg, were now added dropwise under the same vacuum, and the mixture was poured into the mould according to Example 1, pre-warmed to 100° C. After a heat treatment of 2 hours at 100° C, mouldings having the following properties were obtained:
tensile strength according to ISO R 527 = 690 kg/cm²
elongation at break according to ISO R 527 = 7 percent Example 11

234 g (= 0.85 OH equivalent) of the trihydroxyester IV and 117 g (= 0.15 equivalent) of the polyester H were stirred for 1 hour at 130° C. and 12 mm Hg. 84 g (= 1.0 equivalent) of hexamethylenediisocyanate, having an isocyanate content of 11.9 equivalents/kg, were now added dropwise, and the mixture was poured into the moulds according to Example 1, pre-warmed to 100° C. After a heat treatment of 2 hours at 100° C., mouldings having the following properties were obtained:
tensile strength according to ISO R 527 = 130 kg/cm²
elongation at break according to ISO R 527 = 235 percent Example 12

234 g (= 0.85 OH equivalent) of the trihydroxyester IV and 117 g (= 0.15 equivalent) of the polyester H were stirred for 1 hour at 130° C. and 12 mm Hg. 167 g (= 1.0 equivalent) of 1,3-di-($\gamma$-isocyanatopropyl)-5,5-dimethylhydantoin, having an isocyanate content of 5.99 equivalents/kg, were now added dropwise under the same vacuum, and the mixture was poured into the moulds according to Example 1, pre-warmed to 100° C. After a heat treatment of 2 hours at 100° C., mouldings having the following properties were obtained:
tensile strength according to ISO R 527 = 196 kg/cm²
elongation at break according to ISO R 527 = 250 percent Example 13

192 g (= 0.7 OH equivalent) of the trihydroxyester IV and 233 g (= 0.3 equivalent) of the polyester H were warmed to 130° C. and briefly subjected to a vacuum in a vacuum cabinet, 125 g (= 1.0 equivalent) of diphenylmethane-4,4'-diisocyanate, having an isocyanate content of 8.0 equivalents/kg, were added, and the whole was well mixed at 80° C. Thereafter a part of the mixture was applied to an "Anticorodal" sheet and to a polyester film. After a heat treatment of 2 hours at 100° C., a tough film of high gloss, which adheres well to "Anticorodal" and to polyester film, was obtained.

We claim:

1. A heat-curable composition of matter which comprises (1) a polyisocyanate with an average of at least about two isocyanate groups in the molecule; (2) a long-chain polyester, containing terminal hydroxyl groups, of the formula

HO – X – OH wherein X denotes a polyester radical in which branched alkylene unbranched alkylene or alkenylene chains alternate with carboxylic acid ester groups, and wherein the quotient Z/Q, wherein Z is the number of the carbon atoms present in hydrocarbon radicals in the recurring structural element of the radical X, and Q is the number of oxygen bridges present in the recurring structural element of the radical X, must be at least 4, and wherein, further, the total number of the carbon atoms present in the radical X in alternating hydrocarbon radicals is at least 30 and (3) an aromatic polycarboxylic acid hydroxyester, containing at least one secondary hydroxyl group, of the formula

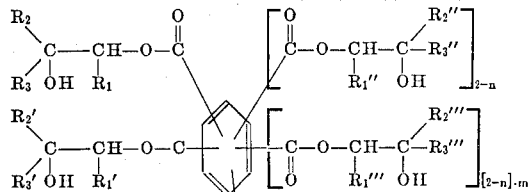

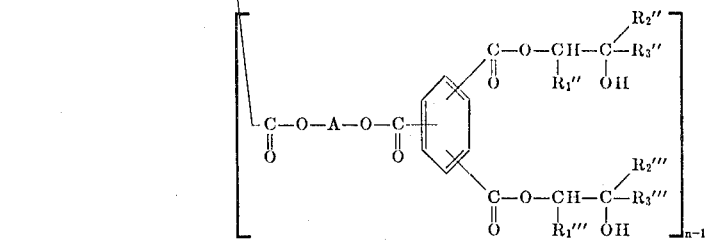

(II)

wherein $R_1$, $R_1'$, $R_1''$, $R_1'''$, $R_2$, $R_2'$, $R_2''$ and $R_2'''$ each denotes a hydrogen atom or a methyl group, or $R_1$ and $R_2$, or $R_1'$ and $R_2'$, or $R_1''$ and $R_2''$ or $R_1'''$ and $R_2'''$ together form a divalent cycloaliphatic radical required for completing a ring, $R_3$, $R_3'$, $R_3''$ and $R_3'''$ each denotes a member selected from the group consisting of hydrogen atom, alkyl with one to four carbon atoms, cyclohexyl, cyclopentyl, phenyl and unsubstituted or substituted oxygen atom-interrupted aralkyl, with at least one of the members $R_3$, $R_3'$, $R_3''$ or $R_3'''$ representing such an aliphatic, cycloaliphatic, araliphatic or aromatic radical, A denotes an alkylene radical with two to three carbon atoms, m denotes the number 0 or 1 and n denotes the number 1 or 2, and that the curable mixture contains, per 1 equivalent of isocyanate group of the polyisocyanate (1), 0.3 to 1.0 equivalent of hydroxyl groups of the aromatic polycarboxylic acid ester (3) which contains hydroxyl groups, and 0.02 to 0.5 equivalent of hydroxyl group of the polyester (2).

2. A heat-curable composition of matter which comprises (1) a polyisocyanate with an average of at least about two isocyanate groups in the molecule; (2) a long-chain polyester, containing terminal hydroxyl groups, of the formula

HO – X – OH wherein X denotes a polyester radical in which branched alkylene unbranched alkylene or alkenylene chains alternate with carboxylic acid ester groups, and wherein the quotient Z/Q, wherein Z is the number of the carbon atoms present in hydrocarbon radicals in the recurring structural element of the radical X, and Q is the number of oxygen bridges present in the recurring structural element of the radical X, must be at least 5, and wherein, further, the total number of the carbon atoms present in the radical X in alternating hydrocarbon radicals is at least 50, and (3) an aromatic polycarboxylic acid hydroxyester, containing at least one secondary hydroxyl group, of the formula

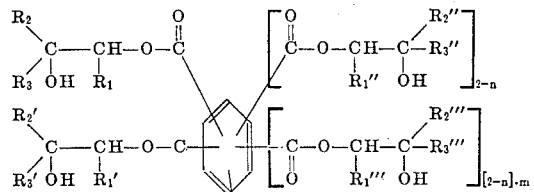

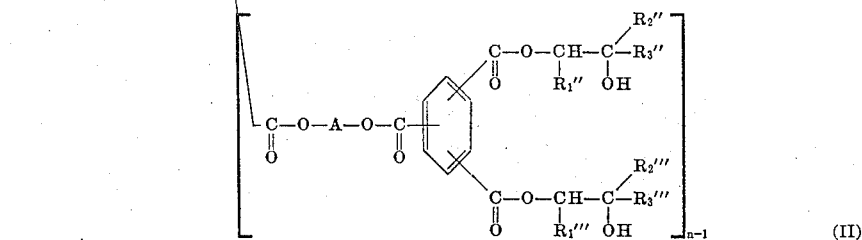

(II)

wherein $R_1$, $R_1'$, $R_1''$, $R_1'''$, $R_2$, $R_2'$, $R_2''$ and $R_2'''$ each denotes a hydrogen atom or a methyl group, or $R_1$ and $R_2$, or $R_1'$ and $R_2'$, or $R_1''$ and $R_2''$ or $R_1'''$ and $R_2'''$ together form a divalent aliphatic or cycloaliphatic radical required for completing a ring, $R_3$, $R_3'$, $R_3''$ and $R_3'''$ each denotes a member selected from the group consisting of hydrogen atom, alkyl with one to four carbon atoms, cyclohexyl, phenyl and unsubstituted or substituted oxygen atom-interrupted aralkyl with at least one of the radicals $R_3$, $R_3'$, $R_3''$ or $R_3'''$ representing such an aliphatic, cycloaliphatic, araliphatic or aromatic radical, A denotes an alkylene radical with two to three carbon atoms, m denotes the number 0 or 1 and n denotes the number 1 or 2, and that the curable mixture contains, per 1 equivalent of isocyanate group of the polyisocyanate (1), 0.3 to 1.0 equivalent of hydroxyl groups of the aromatic polycarboxylic acid ester (3) which contains hydroxyl groups, and 0.05 to 0.3 equivalent of hydroxyl group of the polyester (2).

3. A composition according to claim 1, which contains instead of the individual components (1) and (2) a pre-reacted adduct of the polyisocyanate (1) and the polyester (2), wherein 0.02 to 0.5 hydroxyl group equivalent of the polyester were used per 1 equivalent of isocyanate group for the adduct formation.

4. A composition according to claim 1, which contains as the component (1) a diisocyanate of the aliphatic, cycloaliphatic, cycloaliphatic-aliphatic, araliphatic or heterocyclic-aliphatic series.

5. A composition according to claim 4, which contains as the component (1) 3,5,5-trimethyl-3-isocyanatomethyl-cyclohexane-1-isocyanate.

6. A composition according to claim 4, which contains as the component (1) hexamethylene-diisocyanate.

7. A composition according to claim 4, which contains as the component (1) 1,3-di(γ-isocyanatopropyl)-5,5-dimethyl-hydantoin 8. A composition according to claim 4, which contains as the component (1) diphenylmethane-4,4'-diisocyanate.

9. A composition according to claim 1, which contains as the component (2) a polyester containing hydroxyl groups, of the formula

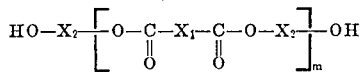

wherein $X_1$ and $X_2$ denote branched or unbranched alkylene or alkenylene chains, with each of the two radicals $X_1$ and $X_2$ having to contain at least such a number of carbon atoms that the sum of the carbon atoms in $X_1$ and $X_2$ together is at least 8, and wherein the number $m$ is so chosen that the product of $m$ and of the sum (C atoms in $X_1$ + C atoms in $X_2$) is at least 50.

10. A composition according to claim 1, which contains as the component (2) a polyester containing hydroxyl groups, of the formula

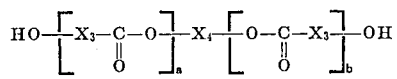

wherein $X_3$ denotes an alkylene chain with at least five carbon atoms, $X_4$ represents an aliphatic hydrocarbon radical, and the numbers $a$ and $b$ are so chosen that the product of $(a + b)$ and of the sum (C atoms in $X_3$) is at least 50.

11. A composition according to claim 1, which contains as the component (3) a polyhydroxyester of trimellitic acid, containing at least one secondary hydroxyl group of the formula

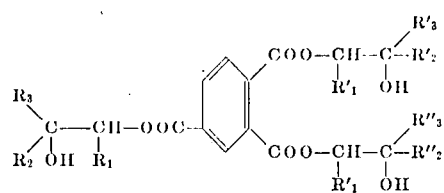

wherein the symbols R have the same meaning as in claim 1.

12. A composition according to claim 11, which contains as the component (3) the trimellitic acid hydroxyester of the formula

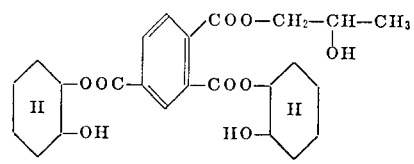

13. A composition according to claim 11, which contains as the component (3) the trimellitic acid hydroxyester of the formula

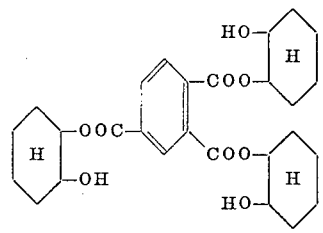

14. A composition according to claim 1, which contains as the component (3) a polyhydroxyester of pyromellitic acid, containing at least one secondary hydroxyl group of the formula

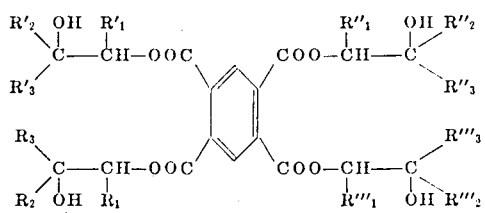

wherein the symbols R have the same meaning as in claim 1.

15. A composition according to claim 14, which contains as the component (3) the pyromellitic acid hydroxyester of the formula

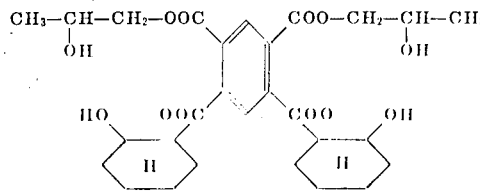

* * * * *